United States Patent [19]

Dent et al.

[11] Patent Number: 5,335,250
[45] Date of Patent: Aug. 2, 1994

[54] METHOD AND APPARATUS FOR BIDIRECTIONAL DEMODULATION OF DIGITALLY MODULATED SIGNALS

[75] Inventors: Paul W. Dent, Stehag, Sweden; Sandeep Chennakeshu, Schenectady, N.Y.

[73] Assignee: Ericsson GE Mobile Communications Inc., Research Triangle Park, N.C.

[21] Appl. No.: 965,848

[22] Filed: Oct. 22, 1992

[51] Int. Cl.$^5$ .............................................. H04Q 1/20
[52] U.S. Cl. ......................................... 375/10; 375/94
[58] Field of Search ..................................... 375/13–15, 375/17–18, 38–39, 43, 80, 83–86, 94, 96, 101, 103, 10; 371/43; 329/300, 304

[56] References Cited

U.S. PATENT DOCUMENTS

| | | | |
|---|---|---|---|
| 5,063,573 | 11/1991 | Langewellpott | 375/14 |
| 5,164,962 | 11/1992 | Nakai et al. | 375/101 |
| 5,182,749 | 1/1993 | Kazecki et al. | 370/100.1 |
| 5,185,764 | 2/1993 | Baier | 375/13 |
| 5,199,047 | 3/1993 | Koch | 375/96 |
| 5,204,878 | 4/1993 | Larsson | 375/94 |
| 5,263,026 | 11/1993 | Parr et al. | 370/95.1 |

FOREIGN PATENT DOCUMENTS 90850301.4 9/1990 European Pat. Off. .

OTHER PUBLICATIONS

F. Stremler, *Introduction to Communication Systems*, pp. 544–551 and pp. 571–628, Addison–Wesley Publishing Co., Inc. (1982).

H. Taub et al., *Principles of Communication Systems*, pp. 222–227, McGraw–Hill, Inc. (1971).

G. Clark et al., *Error–Correction Coding for Digital Communications*, Chapters 6 and 7, Plenum Press (1981).

N. R. Sollenberger et al., "Low–Overhead Symbol Timing and Carrier Recovery for TDMA Portable Radio Systems", *IEEE Trans. on Communications*, vol. 38, No. 10, pp. 1886–1892 (Oct. 1990).

Suzuki, "Performance of a New Adaptive Diversity-Equalization for Digital Mobile Radio", *Electronics Letters*, vol. 26, pp. 626–627 (1990).

*Primary Examiner*—Stephen Chin
*Assistant Examiner*—Young Tse
*Attorney, Agent, or Firm*—Burns, Doane, Swecker & Mathis

[57] ABSTRACT

A method and apparatus for demodulating data symbols transmitted through a fading communication channel. A plurality of first predetermined data symbols, a plurality of unknown data symbols, and a plurality of second predetermined data symbols are sequentially received. The received pluralities of data symbols are stored, and first and second sets of reference signals from the stored pluralities of first and second predetermined data symbols, respectively, are determined. The stored unknown data symbols based on the first set of reference signals are forward-demodulated, beginning with unknown symbols received nearer the first predetermined data symbols. The stored unknown data symbols based on the second set of reference signals are backward-demodulated, beginning with the unknown data symbols received nearer the second predetermined data symbols. Quality values indicative of demodulation qualities of the forward- and backward-demodulated data symbols are determined. The quality values are compared, and either the forward- or backward-demodulated data symbols are selected based on the comparison of quality values.

19 Claims, 4 Drawing Sheets

| KNOWN SYMBOLS | UNKNOWN SYMBOLS | KNOWN SYMBOLS | UNKNOWN SYMBOLS | KNOWN SYMBOLS |
|---|---|---|---|---|
| 11 | 12 | 13 | 14 | 15 |

| 14 SYNC | 6 SACCH | 65 DATA | 6 CDVCC | 65 DATA | 6 RESERVED | 14 SYNC |
|---|---|---|---|---|---|---|
| 16 | 17 | | 18 | 19 | | 20 |

| OLDER SYMBOL HISTORY | STATE NO. | METRIC | EXPECTED COMPLEX VALUES |||| 
|---|---|---|---|---|---|---|
| | | | 00 | 01 | 10 | 11 |
| SOFT VALUES & METRICS | 00 | 28.2 | $z_{0,0}$ | $z_{0,1}$ | $z_{0,2}$ | $z_{0,3}$ |
| SOFT VALUES & METRICS | 01 | 35.6 | $z_{1,0}$ | $z_{1,1}$ | $z_{1,2}$ | $z_{1,3}$ |
| SOFT VALUES & METRICS | 10 | 10.3 | $z_{2,0}$ | $z_{2,1}$ | $z_{2,2}$ | $z_{2,3}$ |
| SOFT VALUES & METRICS | 11 | 39.0 | $z_{3,0}$ | $z_{3,1}$ | $z_{3,2}$ | $z_{3,3}$ |

DECIDED VALUES ←——— DECISION DELAY ———→

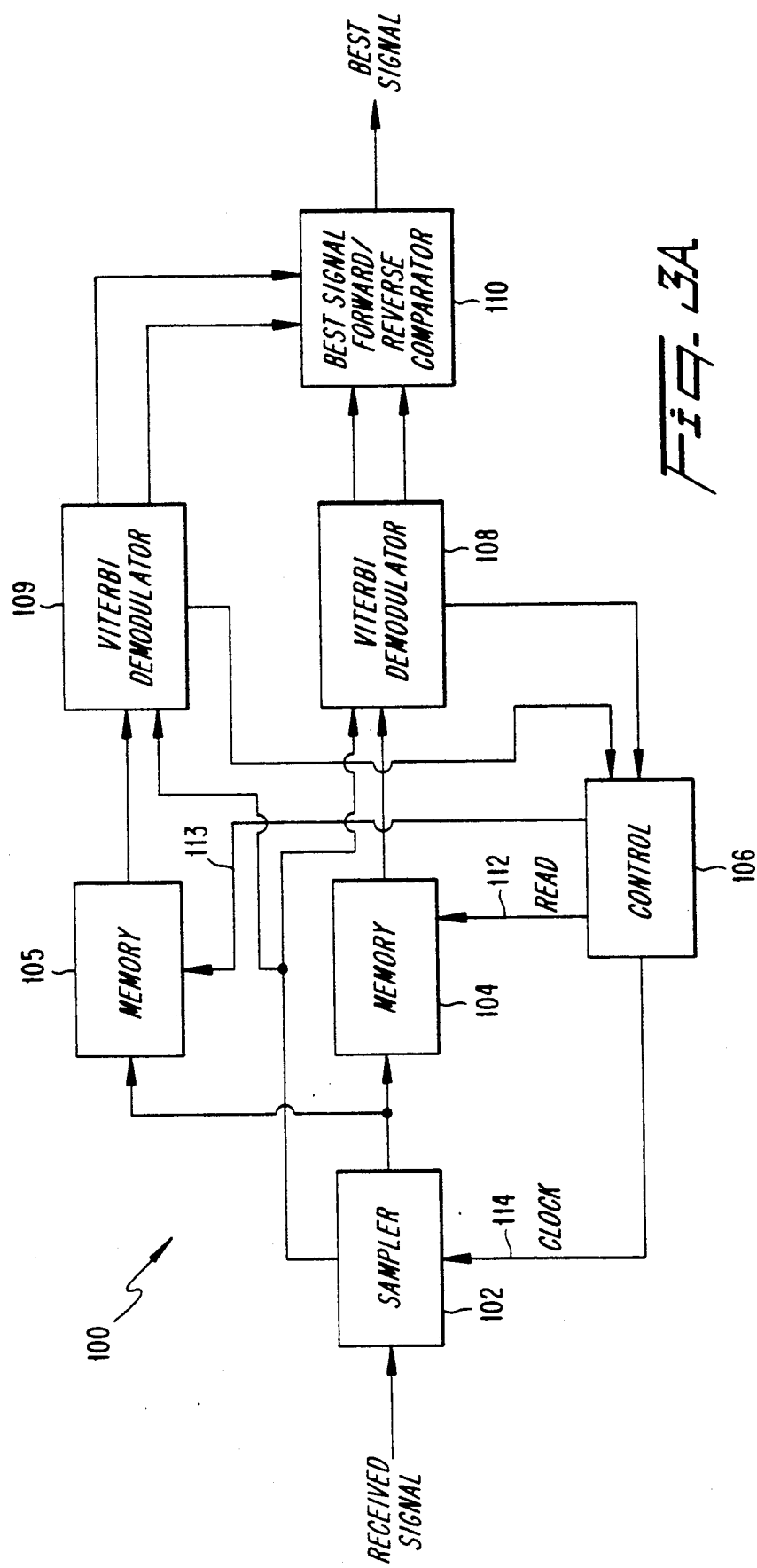

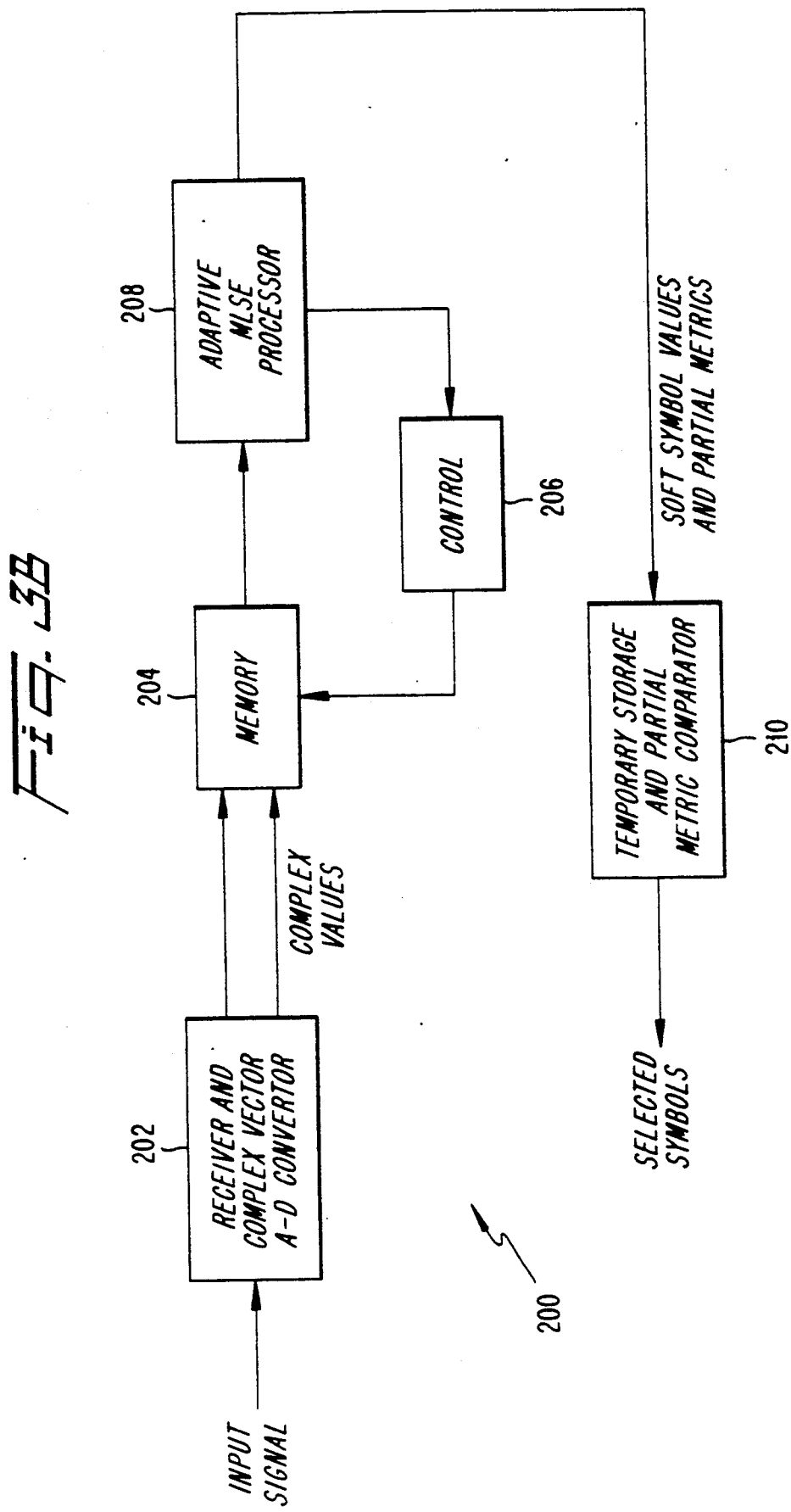

METHOD AND APPARATUS FOR BIDIRECTIONAL DEMODULATION OF DIGITALLY MODULATED SIGNALS

FIELD OF THE INVENTION

The present invention relates to the demodulation of digitally modulated signals, particularly those received through channels suffering from one or more impairments, such as fading, intersymbol interference, frequency errors, and distortion, that may be temporally constant or time-varying.

BACKGROUND OF THE INVENTION

When digital-data-modulated signals are to be transmitted over a rapidly fading communication channel, such as a skywave radio channel or a mobile radio telephone system, a technique sometimes used to cope with the changing channel is to include a predetermined data symbol pattern in the transmitted signal at suitably frequent intervals. The known symbol pattern is used in a receiver by a channel equalizer to adapt a demodulator to the channel's characteristics. This procedure is known as "training" the equalizer (which is then sometimes referred to as a preset equalizer), and the predetermined symbol pattern is then known as the "training" pattern. The training procedure may also involve correlating the received signal with one or more shifts of the training pattern to determine a corresponding number of points (phase and amplitude) of the channel's impulse response.

The equalizer typically used implements a linear, finite-impulse-response ("FIR") model of the channel, that is a transversal filter or a tapped delay line having complex multiplication weights applied to the tap outputs. The weighted outputs are summed to predict, for each possible data symbol pattern that can be contained within the time span of the channel's impulse response, the signal waveform that should be received for the next data symbol. The predicted waveforms are compared with the actually received waveform, and "votes" for and against the probability of each data symbol pattern being "correct" (i.e., the pattern received) are accumulated. Each "vote" is based on the accuracy of the match between a predicted waveform and the received waveform. The data symbol patterns that can be contained within the time span of the channel's impulse response correspond to the "states" of the system. Such equalizers are described in F. Stremler, *Introduction to Communication Systems*, pp. 544–551, Addison-Wesley Publishing Co., Inc. (1982) and are also known as "Viterbi" equalizers.

The weights applied to the delay line tap outputs are the coefficients, $c_1, c_2, c_3, \ldots$, in the equation:

$$S_i = c_1 D_i + c_2 D_{i-1} + c_3 D_{i-2} + \ldots$$

where $S_i$ is the predicted signal for the sequence of data symbol patterns $D_i, D_{i-1}, D_{i-2}, \ldots$. The coefficients are usually calculated from the known training pattern. In the case of signalling by binary data symbols (i.e., 1 and 0), the number of predicted signals that must be calculated is $2^n$, where $n-1$ is the number of bits in each data symbol pattern D. It will be understood that ternary and quaternary data symbols can also be used.

Methods for optimally updating the channel model from the received signal, such as that described in European Patent Application No. 90850301.4, filed Sep. 10, 1990, are also known, and the best methods maintain a separate channel model for each Viterbi state. When one of the states is selected as the best predecessor of a new state, the channel model corresponding to that state is updated and becomes the channel model for the new state. In this way, it is ensured that the channel models are always derived from the best demodulated data sequences received up to that time.

U.S. patent application Ser. No. 07/894,933, filed Jun. 8, 1992, for "Adaptive Maximum Likelihood Modulator" describes a variation of the adaptive Viterbi equalizer that does not employ channel models to generate the predictions except during system start-up, and thus does not update the channel model parameters. Instead, direct updating of the signal predictions for each state, without going through the intermediate step of first updating the channel models, is described. U.S. patent application Ser. No. 07/894,933 is hereby incorporated by reference into the present application.

The known Viterbi equalizer incorporates the following steps: (1) determining the tap coefficients for a Finite Impulse Response (FIR) model of the channel; (2) for all possible data symbol sequences that can be postulated to be contained within the impulse response length of the channel model, predicting the signal value that should be received based on the determined tap coefficients; (3) comparing each postulated value with the actually received signal value and calculating the mismatch (usually by squaring the difference between the received and postulated values); (4) for each postulated symbol sequence, adding the calculated mismatch to the cumulative mismatch of predecessor sequences that are consistent with the postulated symbol sequence, also called "the state" (the cumulative mismatch values are called "path metrics"); and (5) choosing the "best" of the possible predecessor sequences that can transition to the new postulated state, i.e., choosing the predecessor sequence that gives the lowest path metric for the new state. Thus, the path metrics can be considered confidence factors that represent the degrees of correlation between the postulated symbol sequences and the actually received signal.

It will be appreciated that the Viterbi equalizer is a form of sequential maximum likelihood sequence ("SMLS") estimator that decodes, or demodulates, the received data symbol stream. SMLS estimators and other decoding methods are described in Clark and Cain, *Error-Correction Coding for Digital Communications*, Plenum Press (1981).

FIG. 2 illustrates the data structure and flow within a Viterbi equalizer having 16 states, the predicted signal values being assumed to depend on four previous binary symbols (bits) plus one new bit. The channel impulse response length for this example is thus five symbols, i.e. the latest echo can be four symbols delayed compared to the shortest signal path.

Referring to FIG. 1, a Viterbi processing cycle begins by assuming the postulated symbol history of state 0000 to be true, and that a new bit '0' was transmitted. Consequently, using the channel model (40), the signal value that should be observed given the 5-bit symbol history 00000 is predicted. This is compared in comparator (50) with the actual received signal value and a mismatch value produced. This is added in adder (51) with the previous state 0000 path metric to produce a candidate metric for a new 0000 state.

However, another candidate for the new path metric of new state 0000 can be derived by assuming state 1000 to contain the true history, with a new bit of '0'. This is because both 0000-0 and 1000-0 lead to new state 1-0000 (0-0000) when the oldest (left-most) bit is left shifted out of the 4-bit state number and into the symbol history memory. This candidate is evaluated by applying 10000 to the channel model (40), comparing the prediction so-obtained with the input signal value in comparator (50) and adding the resultant mismatch with the previous cumulative mismatch (path metric) associated with state 1000 in adder (52). The two candidate values from adders 51 and 52 are then compared in a comparator 53, and the lower of the two is selected to become the new path metric of new state 0000. Furthermore, the contents of the history memory (55) associated with the selected predecessor state is selected to be the symbol history of the new state 0000. Also, the selected bit history is left-shifted and a 0 or 1 entered in the rightmost position according as state 0000 or 1000 gave rise to the selected candidate path metric.

The above procedure is then repeated with the assumption that the new bit is a '1' in order to produce a new state 0001, also with either state 0000 or 1000 as candidate predecessors.

The above procedure is then repeated using every pair of states, which are 8 states apart, to derive all 16 new states, as follows:

0001,1001 to produce new states 0010 and 0011
0010,1010 to produce new states 0100 and 0101
0011,1011 to produce new states 0110 and 0111
0100,1100 to produce new states 1000 and 1001
0101,1101 to produce new states 1010 and 1011
0110,1110 to produce new states 1100 and 1101
0111,1111 to produce new states 1110 and 1111

At the end of the above processing cycle, one signal sample has been processed and one extra bit has been demodulated and inserted into symbol history memories (55). There is a tendency for the older bits in the history memories to converge to the same value, at which point that bit can be extracted as a final unambiguous decision and the history memory shortened 1 bit. Other methods of truncating history memory growth are known to the art, such as taking the oldest bit from the state having the lowest path metric.

It will be understood that the Viterbi equalizer recognizes that some sequences of data symbol patterns, and thus some sequences of predicted waveforms, are not valid. For example, a prediction that the channel carried the binary data symbol pattern 10010 at one instant (i.e., one bit period) and a prediction that the channel carried the binary data symbol pattern 11001 at the next instant (i.e., the next bit period) are inconsistent because the pattern 10010 can be followed only by the patterns 00100 or 00101 (assuming a left-shift in passing through the channel.) Also under such conditions, each of the 00100 and 00101 patterns can have only either 10010 or 00010 as predecessors. Thus, a set of transition rules constrains the number of ways the votes can be sequentially accumulated for each sequence of predicted waveforms.

It will be appreciated that such prior demodulators operate on the received signal only in the forward direction: a received training pattern is used to develop predicted waveforms for yet-to-be-received data symbols. If the training pattern is lost or excessively distorted due to severe channel fading, intersymbol interference, frequency errors, etc., such forward demodulators must wait until the next training pattern is successfully received before they are able to demodulate accurately. As a result, data sent in the intervening periods between training patterns can be lost.

SUMMARY OF THE INVENTION

The present invention provides a method and apparatus for minimizing such loss of intervening data by demodulating the intervening data not only forward from a received training pattern but also backward from the next-received training pattern. In general, this is accomplished by storing a sequence of received signal samples, time-reversing the stored sequence, and estimating quality factors for both forward and backward demodulations of the stored and time-reversed sequences, respectively, to determine how many data symbols should be decoded by forward demodulation and how many should be decoded by backward demodulation.

BRIEF DESCRIPTION OF THE DRAWINGS

The features and advantages of the present invention will become apparent from reading the following detailed description in conjunction with the drawings, in which:

FIG. 3A shows an apparatus for demodulating transmitted data symbols;

FIG. 3B is a block diagram of a demodulator in a digital cellular telephone system.

DETAILED DESCRIPTION OF THE DISCLOSURE

Figure 1:
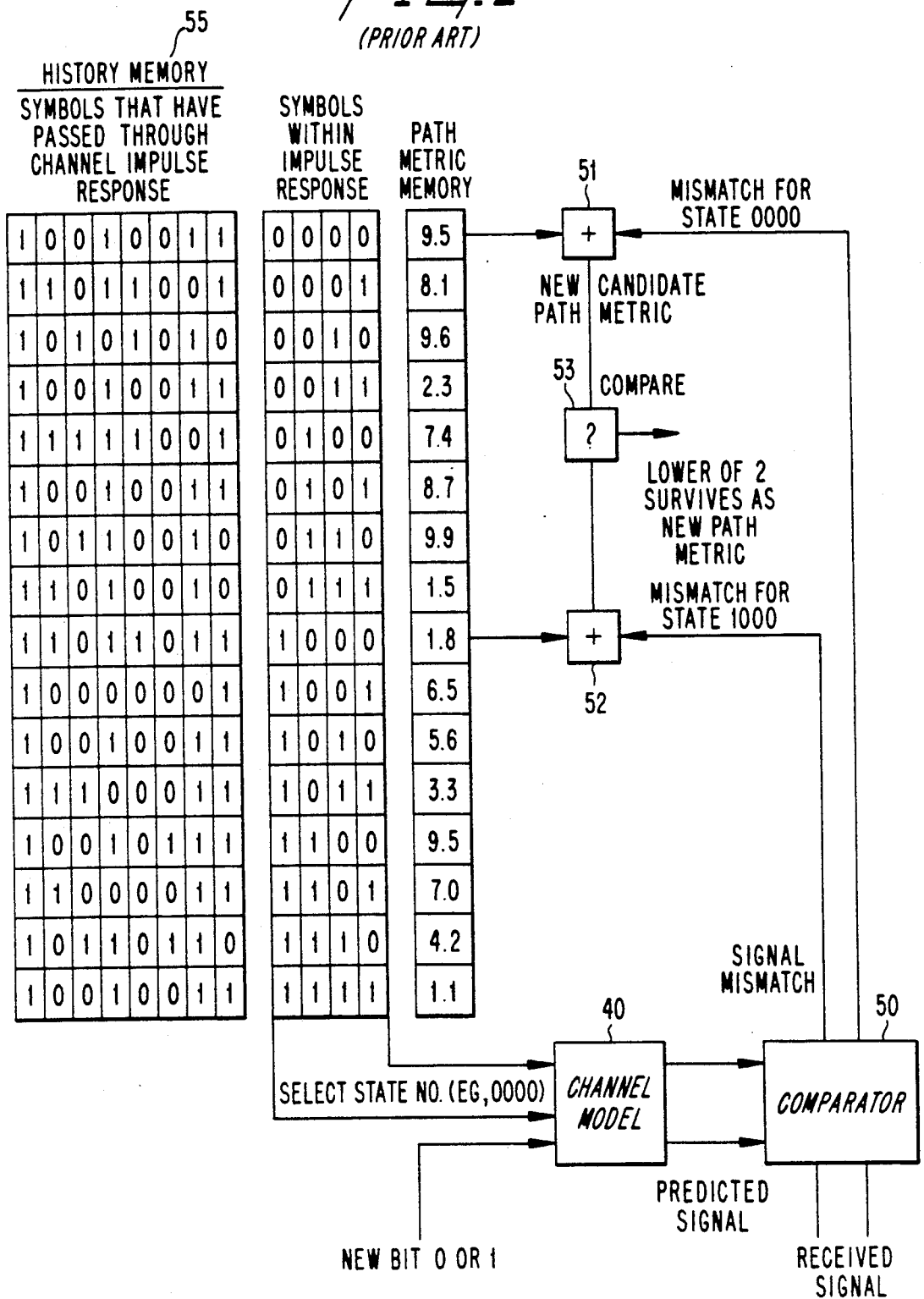
FIG. 1 is a diagrammatic representation of a maximum likelihood algorithm that can be used to implement a demodulator.
Figures 2A, 2B, 4:
FIG. 2A shows the format of a portion of a signal for processing in accordance with the present invention.
FIG. 2B shows the format of a portion of a signal transmitted in a digital cellular telephone system.
FIG. 4 illustrates an arrangement of memory values for a 4-state adaptive sequential maximum likelihood sequence estimator.

FIG. 2A shows the format of a portion 10 of a data-modulated signal that might be processed by a method and apparatus in accordance with the present invention. The portion 10 comprises: a plurality of first predetermined data symbols 11, which are known beforehand to a receiver and precede a first plurality of unknown data symbols 12; a plurality of second predetermined data symbols 13, which are known beforehand to the receiver precedes a second plurality of unknown data symbols 14; and a plurality of third predetermined data symbols 15, which are known beforehand to the receiver. It will be appreciated that the portion 10 is only a small part of the communication signal that is used for illustration purposes. In a time-multiplexed communication system, the data symbols 12 could be intended for reception by a first receiver that uses the data symbols 11 as its equalizer training pattern, and the data symbols 14 could be intended for a second receiver that uses the data symbols 13 as its equalizer training pattern.

In accordance with the present invention, the pluralities 11, 13, of first and second predetermined symbols, are used by one receiver to improve demodulation of the intervening plurality of unknown data symbols 12. Also, the plurality 13, of second predetermined data symbols, can be used by another receiver in conjunction with the later plurality of third predetermined data symbols 15 to demodulate the intervening plurality of unknown data symbols 14. It will be appreciated that the pluralities of first and second predetermined symbols may be identical to the plurality of third predetermined symbols and that patterns of predetermined data symbols may be interspersed among the unknown data symbols 12 in order to demodulate better the unknown symbols.

An apparatus in accordance with the present invention preferably employs one of the Viterbi sequential maximum likelihood sequence estimators described above. Other demodulator types, for example, coherent types such as phase-shift keying ("PSK") or quadrature PSK ("QPSK") demodulators, differentially coherent types such as DPSK or DQPSK demodulators, and the simplified Viterbi demodulator described below, are also suitable, provided some measure of the quality of the data symbol decoding decisions can be obtained from the demodulator. Several such demodulators are described in the literature, including H. Taub et al., *Principles of Communication Systems*, pp. 222-227, McGraw-Hill, Inc. (1971); and F. Stremler, *Introduction to Communication Systems*, pp. 571-628, Addison-Wesley Publishing Co., Inc. (1982). For a Viterbi demodulator, the path metric serves as the measure of the cumulative quality of the symbols already decoded.

Referring to FIG. 3A, an apparatus 100 for demodulating transmitted data symbols in accordance with one aspect of the invention comprises a received signal sampler 102 that digitizes the received signal after suitable amplitude conditioning; the signal sample values are then stored in a suitable memory 104. The signal samples are recalled from the memory 104 in response to control signals generated by a controller 106, and presented to a Viterbi demodulator 108. The controller 106 may also generate appropriately timed signals for triggering the signal sampler 102.

The stored signal samples are first recalled from the memory 104 in normal time order, namely, the predetermined data symbols 11 followed by the unknown data symbols 12. As described above, the Viterbi demodulator 108 uses the known symbols 11 to predict for each possible sequence of unknown symbols 12 the received signal sample values. A comparator 110 compares the sequence of actually received signal sample values with the predicted sequences of signal sample values, and determines the predicted sequence that gives the best match, i.e., the lowest cumulative path metric.

The controller 106 then recalls the received signal samples from the memory 104 in reverse time order, namely, predetermined symbols 13 (reversed), followed by the unknown data symbols 12 (reversed), and the backwards signal samples are presented to the Viterbi demodulator 108. The Viterbi demodulator 108 and the comparator 110 process the backwards signal samples in the same way that the forward signal samples were processed. Thus, the time-reversed sequence of predetermined symbols 13 is used to predict the signal sample values expected for each possible time-reversed sequence of the unknown data symbols 12, and the prediction giving the best match (lowest cumulative path metric) is determined.

The comparator 110 compares the best-match path metrics of the forward and backward demodulations, and the predicted data symbol sequence corresponding to the lower best-match path metric is selected as the demodulation of the unknown data symbol pattern 12. It will be appreciated that the operations described herein can be conveniently carried out by means of a signal processor consisting of a random access memory for holding signal samples and the results of intermediate calculations, an arithmetic and logic unit (ALU) capable of performing the operations of ADD, SUBTRACT, and MULTIPLY, and a program memory holding a list of instructions for the ALU together with a controller that can transfer execution of instructions from one place to another within the list depending on the result of an arithmetic operation such as SUBTRACT, which can be used to perform magnitude comparisons. A suitable signal processor is, for example, the TEXAS INSTRUMENTS TM320C50.

By its use of a second predetermined symbol sequence, or training pattern, as described above, bidirectional demodulation is advantageously robust against losses of the predetermined symbol sequences (e.g., losses due to channel fading). For example, a deep fade occurring nearer one of the predetermined signal sequences can induce errors in a conventional demodulator in which the channel model is updated based on the received signal (i.e., the equalizer is adaptive). In contrast, the present demodulator would be unaffected: if the fade occurs nearer training pattern 11 than training pattern 13, then the reverse demodulation would succeed for a longer sequence of data symbols than the forward demodulation (producing a lower cumulative path metric for the reverse demodulation), and would be selected by the processor 110. Thus, the present bidirectional demodulator selects that demodulation direction giving the greater run-length of successfully demodulated symbols.

This desirable tendency is encouraged in a second aspect of the invention, in which two partial path metrics are determined by forward-demodulating half the received unknown data symbols 12 and backward-demodulating the other half. Each of the best-match path metrics determined by forward- and backward-demodulating all the symbols 12 is then compared with the sum of the two partial path metrics, and the predicted data symbol sequence corresponding to the best of the three path metrics is selected and output as the demodulation of the unknown data symbol pattern. The foregoing requires a negligible amount of additional processing, but gives additional robustness against a deep fade occurring near the center of the unknown data symbol sequence.

The partial path metrics developed after decoding each symbol in each direction are also used in another aspect of the present invention. Denoting by $f_n$ the best path metric determined by decoding a number n of symbols in the forward direction and by $b_n$ the corresponding best path metric in the reverse direction (the initial values $f_0$ and $b_0$ being zero), the sums of pairs of partial metrics are $f_0+b_n$, $f_1+b_{(n-1)}$, $f_2+b_{(n-2)}$, ..., $f_{(n-1)}+b_1$, $f_n+b_0$. It should be appreciated that the lowest pair-sum indicates the optimum changeover point from forward to backward demodulation. For example, if the lowest pair-sum is $f_k+b_{(n-k)}$, then the optimal demodulation of the unknown data symbols consists of the symbols 1 to k determined by forward demodulation and the data symbols (k+1) to n determined by backward demodulation.

It will be appreciated that the above-described two-way demodulations involve essentially double the effort of conventional one-way demodulation. As described below, other methods in accordance with the present invention avoid significant increases in processing effort.

In a first such method, which may be called fade position estimation, the region that has the lowest received energy is located in the received signal samples stored in the memory 104. The region may be located by, for example, calculating the mean energy of the signal samples within a moving window a few data symbols wide as the window is moved through the array of stored samples; the minimum mean energy value is identified as the deepest fade position. As an alternative, the largest signal sample value in a few-symbols-wide moving window can be determined, and the smallest of these largest values is located and identified as the deepest fade position.

It will be appreciated that determining the minimum mean energy or largest sample value in a window moved through the received signal sample array requires much less processing effort than demodulating the signal samples. Once the deepest fade is located, either forward demodulation only is used (e.g., when the deepest fade occurs in the second predetermined symbols 13), or backward demodulation only is used (when the deepest fade occurs in the first predetermined symbols 11), or forward demodulation of the symbols up to the deepest fade position and backward demodulation back to the deepest fade position are used.

A second method of avoiding double demodulation effort is to start forward and backward demodulation in parallel, but to adapt the demodulation speed to the relative growth of the Viterbi path metrics as follows. The received signal samples are stored, and the path metrics for both demodulation directions are initialized to zero; the first received stored sample is forward demodulated and the last received stored sample is backward demodulated. The best path metrics of the forward and backward demodulations are then compared; based on which direction yields the better (lower) path metric value, either the second or the next-to-last symbol is then demodulated, i.e., either the forward or the reverse demodulation is extended. The process continues symbol by symbol until the forward and backward demodulations meet. In this way, more symbols are decoded in the direction giving the slower path-metric-value growth, i.e., the "better" direction.

It will be appreciated that the above-described methods may be used with simpler demodulators than the multi-state Viterbi equalizer. For example, a symbol-by-symbol demodulator that also generates path metrics may be constructed by simplifying a Viterbi demodulator to a single state. Such a simplified Viterbi demodulator compares each received signal sample with reference signal values corresponding to all values a data symbol can have, decides which reference value (and therefore which data symbol) the received signal most closely matches, and accumulates the residual mismatch as a cumulative quality measure or path metric.

The foregoing methods may be used either with differentially encoded modulations, such as minimum-shift keying ("MSK"), 4-MSK, or DQPSK, in which data is encoded in the changes between signal samples, or with coherent modulations, such as PSK or QPSK, in which data is encoded in the absolute values of the signal samples. For differential modulations, the forward and backward demodulated symbol sequences represent absolute signal values that can then be decoded differentially by comparing neighboring values to determine the changes, and thus the transmitted data.

An important application of the present invention is in receiving $\pi/4$-DQPSK signals transmitted by a digital cellular radio telephone base station conforming to the CTIA standard IS54. The format of the transmitted data is shown in FIG. 2B. A group 16 of fourteen predetermined symbols for synchronization, or training, precedes a group 17 of unknown quaternary data symbols that each bear two bits of data. The group 17 comprises two subgroups of six and sixty-five symbols, and precedes another group 18 of six predetermined symbols that is usually called the CDVCC. The groups 16-18 are followed by another group 19 of unknown quaternary data symbols that each bear two bits of data, and another group 20 of fourteen predetermined symbols. The group 19 comprises two subgroups of sixty-five and six symbols. It will be noted that this format is symmetrical when viewed in the forward and backward time directions.

In accordance with another aspect of the present invention, a 4-state adaptive sequential maximum likelihood sequence estimation ("SMLSE") algorithm is preferably used in the demodulator 108 for received signals having the format of FIG. 2B. The arrangement of values stored in the memory 104 is shown in FIG. 4, and this storage arrangement is used for both the forward and backward demodulation directions. The operation and other advantageous implementation details of the demodulator are described more fully in the above-cited U.S. patent application Ser. No. 07/894,933, which is hereby expressly incorporated by reference.

In accordance with one aspect of the invention, a new feature is incorporated into the Viterbi structure to facilitate implementation: current-state path metric values are recorded in a symbol sequence history memory array along with soft symbol values. This storage of the history from surviving predecessor states to successor states ensures that a list of partial path metric values corresponding to the surviving symbol sequence is available. To reduce storage requirements, the symbol history does not need to be the entire length of the demodulated symbol sequence, but may be truncated to a number of symbols called the "decision delay"; in a preferred implementation, the decision delay is sixteen symbols.

Truncation occurs automatically whenever the oldest symbol and its respective partial path metric value are the same in every state. Otherwise, the symbol history is truncated by deleting the oldest symbol and its partial path metric value, having stored in a "decided values" memory array the values from the state currently having the lowest path metric value. The final contents of the "decided values" memory array concatenated with the symbol history of the state having the lowest final path metric value give the demodulated symbol sequence and the associated partial path metric values, which correspond to the $f_0, f_1, \ldots, f_n$ and $b_0, b_1, \ldots, b_n$ discussed above.

An apparatus 200 for carrying out the foregoing is shown in FIG. 3B. A receiver 202 adapted to the expected type of input signal (e.g., a radio receiver tuned to the correct frequency) suitably amplifies and filters an input signal before converting it into complex vector components by means of a suitable analog-to-digital ("A-D") convertor. In a digital cellular radio system, the A-D convertor typically samples the input signal eight times during each symbol period, but only one of these "sampling phases" is needed for demodulating data in each direction. The digitized received signal samples are collected in a memory 204, and read by an adaptive SMLSE demodulator 208 in both forward and backward time order as described above.

Although only one of the eight sampling phases is needed to demodulate the data, the optimum sampling phase to use is advantageously determined during the adaptive SMLSE processor's initial training process, which includes correlating each of a number (e.g., two) of shifts of the sequence of predetermined symbols with each of the eight sampling phases. The phase that gives the highest total correlation energy summed on two consecutive shifts of the known symbol pattern is deemed the optimum sampling phase. The computations are carried out as follows.

If the received complex signal samples are denoted by $z_0, z_1, z_2, z_3, z_4 \ldots$ and the predetermined symbols by $s_0, s_1, s_2, s_3, \ldots, s_L$, then the process of determining the optimum sampling phase involves the following calculations, for $i=0, 1, \ldots, 7$, of the correlations:

$$C_{0i} = \sum_{j=0}^{L-1} s_j z_{i+8j}^*$$

$$C_{1i} = \sum_{j=0}^{L-1} s_{j+1} z_{i+8j}^*$$

$$C_{2i} = \sum_{j=0}^{L-1} s_{j+2} z_{i+8j}^*$$

and:
$$E_i = C_{0i}^* C_{0i} + C_{1i}^* C_{1i}$$
$$E_{i+8} = C_{1i}^* C_{1i} + C_{2i}^* C_{2i}$$

By choosing the largest correlation energy $E_i$, the respective i value indicates the optimum sampling phase to be used in the adaptive SMLSE processor. It will be appreciated that the above process finds the largest correlation over a two-symbol window. The location of the largest correlation is reported to a control processor 206 that may adjust the receiver's sampling timing for future data blocks to keep the optimum sampling point in the center of the window. This provides long-term synchronization and tracking by the receiver of the received signal.

The preferred implementation performs a full forward demodulation of the symbol group 17 using the group 16 of predetermined symbols, and a full backward demodulation of the group 17 using the known six-symbol CDVCC group 18. The length L of the correlation is twelve for group 17's forward demodulation (and the backward demodulation of unknown symbol group 19) due to the 14-symbol length of group 16 (and group 20) and the use of two correlation shifts.

Since the number of predetermined CDVCC symbols is only six which, for differential modulation, leads to seven coherently related signal samples, the length L of the correlation is only six for group 17's backward demodulation (and for the forward demodulation of the group 19). These correlations are determined from the above expressions for $C_{0i}$, $C_{1i}$, $L=6$, and $E_i$ for $i=0, 1, \ldots, 15$. (The length-six correlations are too short to use a two-symbol window.) By choosing the largest of the $E_i$'s, the respective value indicates the optimum sampling phase for backward demodulating the data symbol group 17 and forward demodulating the data symbol group 19.

The results of the forward and backward demodulations are passed from the SMLSE processor 208 to a processor 210 for temporary storage and comparison of the partial path metric values for the two directions, as described above, to determine the optimum point up to which forward demodulated symbols are selected for output; the balance of the output symbols are those backward demodulated. This partial path metric value comparison and symbol selection process is performed separately for data symbol groups 17 and 19.

Some operational details of the adaptive SMLSE processor 200 are due to the differential decoding of the $\pi/4$-DQPSK, which is handled as follows. When one of the four states is evaluated as a possible predecessor to a new state, the differential symbol represented by the postulated state transition is calculated. For example, the transition from predecessor state 00 to successor state 00 implies a differential symbol 00 (since 00+00=00 mod 2), the transition from 11 to 10 implies a differential symbol 01 (since 11+01=10 mod 2), and so on. Soft information is generated for the two constituent bits of the differential symbol as the difference between the surviving path metric and the path metric for the transition with each bit of its implied differential symbol inverted in turn, and the differences, accorded the signs of the differential symbol bit-pair, are entered into the symbol history. These soft values may be used subsequently in an error-correction decoding process, such as a soft-decision, viterbi convolutional decoder.

It is, of course, possible to embody the invention in specific forms other than those described above without departing from the spirit of the invention. The embodiments described above are merely illustrative and should not be considered restrictive in any way. The scope of the invention is given by the appended claims, rather than the preceding description, and all variations and equivalents which fall within the range of the claims are intended to be embraced therein.

We claim:

1. A method for demodulating data symbols transmitted through a communication channel comprising the steps of:

sequentially receiving a plurality of first signal samples corresponding to predetermined data symbols, a second plurality of signal samples corresponding to unknown data symbols, and a third plurality of signal samples corresponding to a set of second predetermined data symbols;

storing the received pluralities of data samples;

determining first and second sets of reference signals from the stored pluralities of first and third signal samples, respectively;

forward-demodulating said unknown data symbols using said first set of reference signals beginning with signal samples received nearer said first plurality of signal samples;

backward-demodulating said unknown data symbols using said second set of reference signals beginning with signal samples received nearer said third plurality of signal samples;

determining quality values indicative of demodulation qualities of the forward- and backward-demodulated data symbols;

comparing the quality values; and selecting either the forward- or backward-demodulated data symbols based on the comparison of quality values.

2. An apparatus for demodulating data symbols transmitted through a communication channel comprising:

means for sequentially receiving a plurality of first predetermined data symbols, a plurality of unknown data symbols, and a plurality of second predetermined data symbols;

means for storing the received pluralities of data symbols;

means for determining first and second sets of reference signals from the stored pluralities of first and second predetermined data symbols, respectively;

means for forward-demodulating the stored unknown data symbols based on the first set of reference signals beginning with unknown symbols received nearer the first predetermined data symbols;

means for backward-demodulating the stored unknown data symbols based on the second set of reference signals beginning with the unknown data symbols received nearer the second predetermined data symbols;

means for determining quality values indicative of demodulation qualities of the forward- and backward-demodulated data symbols;

means for comparing the quality values; and means for selecting either the forward- or backward-demodulated data symbols based on the comparison of quality values.

3. An apparatus according to claim 2 wherein the receiving means includes a vector analog-to-digital converter having an output operatively connected to the storing means.

4. An apparatus according to claim 2 wherein the reference signal determining means comprises means for correlating the stored pluralities of first and second predetermined data symbols with predetermined data symbol sequences to determine the first and second sets of reference signals.

5. An apparatus according to claim 2 wherein the reference signal determining means includes means for adjusting the first and second sets of reference signals by best-average matching demodulated data symbols to corresponding stored signal samples.

6. An apparatus according to claim 2 wherein the reference signal determining means includes means for adjusting the first and second sets of reference signals to track temporal phase and amplitude variations of the communications channel.

7. An apparatus according to claim 2 wherein the forward- and backward-demodulating means represent demodulated data symbols as probability values that the respective demodulated data symbols correspond to respective transmitted data symbols.

8. An apparatus according to claim 2 wherein the forward- and backward-demodulating means include means for sequentially estimating maximum likelihood sequences.

9. An apparatus according to claim 8 wherein the quality values comprise lowest path metrics developed from the sequence estimating means.

10. An apparatus according to claim 8 wherein the quality values comprise lowest cumulative path metrics determined by summing path metrics associated with respective already-demodulated data symbols with a path metric for symbol being demodulated.

11. An apparatus according to claim 2 wherein the quality values quantify mismatches between demodulated symbols and received signal samples.

12. An apparatus according to claim 11 wherein the quality values are sums of squares of Euclidean distances between the reference signals and respective stored signal samples, and a high sum value signifies low quality and a low sum value signifies high quality.

13. An apparatus according to claim 12 wherein the comparing means compares the sum for complete forward demodulation with the sum for complete backward demodulation.

14. An apparatus according to claim 13 wherein the selecting means selects the demodulated data symbols corresponding to the smaller sum.

15. An apparatus according to claim 14 wherein the selecting means selects a first number of forward-demodulated data symbols and a second number of backward-demodulated data symbols, the sum of the first and second numbers equalling the number of the plurality of unknown data symbols, and the first and second numbers being those that maximize the sum of quality values for the first and second numbers of forward- and backward-demodulated data symbols, respectively.

16. An apparatus according to claim 15 wherein the comparing means compares a sum of quality values for partial forward and partial backward demodulation to the quality values for complete forward and complete backward demodulation of the plurality of unknown data symbols, and the selecting means selects either the forward-, backward-, or partial forward- and partial backward-demodulated symbols.

17. An apparatus according to claim 12 wherein the selecting means selects the demodulated data symbols corresponding to the smaller sum.

18. An apparatus according to claim 2 wherein the quality values are produced for complete forward and complete backward demodulation of the plurality of unknown data symbols, and for partial forward and partial backward demodulation of the plurality of unknown data symbols.

19. An apparatus according to claim 2 wherein the quality values are cumulative measures of the quality of demodulated data symbols.

* * * * *